(12) United States Patent
Frasier

(10) Patent No.: US 7,115,204 B1
(45) Date of Patent: Oct. 3, 2006

(54) POOL PUMP FILTER

(76) Inventor: Ernest D. Frasier, 1720 Ontario Ave., Sheboygan, WI (US) 54935

( * ) Notice: Subject to any disclaimer, the term of this patent is extended or adjusted under 35 U.S.C. 154(b) by 261 days.

(21) Appl. No.: 10/713,698

(22) Filed: Nov. 17, 2003

(51) Int. Cl.
*B01D 37/00* (2006.01)

(52) U.S. Cl. ............... 210/767; 210/169; 210/232; 210/315; 210/338; 210/487; 55/482

(58) Field of Classification Search ............. 210/169
See application file for complete search history.

(56) References Cited

U.S. PATENT DOCUMENTS

| | | | | |
|---|---|---|---|---|
| 3,486,626 | A * | 12/1969 | Close ................... | 210/232 |
| 4,052,317 | A * | 10/1977 | Palnik .................. | 210/323.2 |
| 4,811,559 | A * | 3/1989 | Henkel ................ | 60/303 |
| 4,848,989 | A * | 7/1989 | Maeda ................. | 55/319 |
| 4,988,437 | A * | 1/1991 | Gefter et al. ......... | 210/237 |
| 5,028,323 | A * | 7/1991 | Gould et al. .......... | 210/232 |
| 5,338,446 | A * | 8/1994 | Schuman et al. ...... | 210/169 |
| 6,299,763 | B1 * | 10/2001 | Ashman ................ | 210/94 |
| 6,555,013 | B1 * | 4/2003 | Nakamura et al. ..... | 210/769 |
| 6,860,394 | B1 * | 3/2005 | Mueller et al. ........ | 210/458 |

* cited by examiner

*Primary Examiner*—Robert James Popovics
*Assistant Examiner*—T. Woodruff
(74) *Attorney, Agent, or Firm*—Ryan Kromholz & Manion, S.C.

(57) ABSTRACT

A filter comprises a cage that captures a foraminous center tube. The cage comprises end plates secured to multiple posts. A screen is wrapped with at least one full inner wrap around the center tube and with at least one full outer wrap around the posts. The screen is held in place with elastic bands or the like that surround and press the outer wrap against the posts. The center tube may be free to move within the cage. Alternately, the center tube, end plates, and posts may be integral with each other. When inserted into a chamber, liquid flows through the screen outer and inner wraps in two stages. The liquid then flows through holes in the center tube, through the interior of the center tube, and out the chamber. The filter is cleaned by unwrapping the screen, cleaning it, and rewrapping it over the center tube and posts.

40 Claims, 3 Drawing Sheets

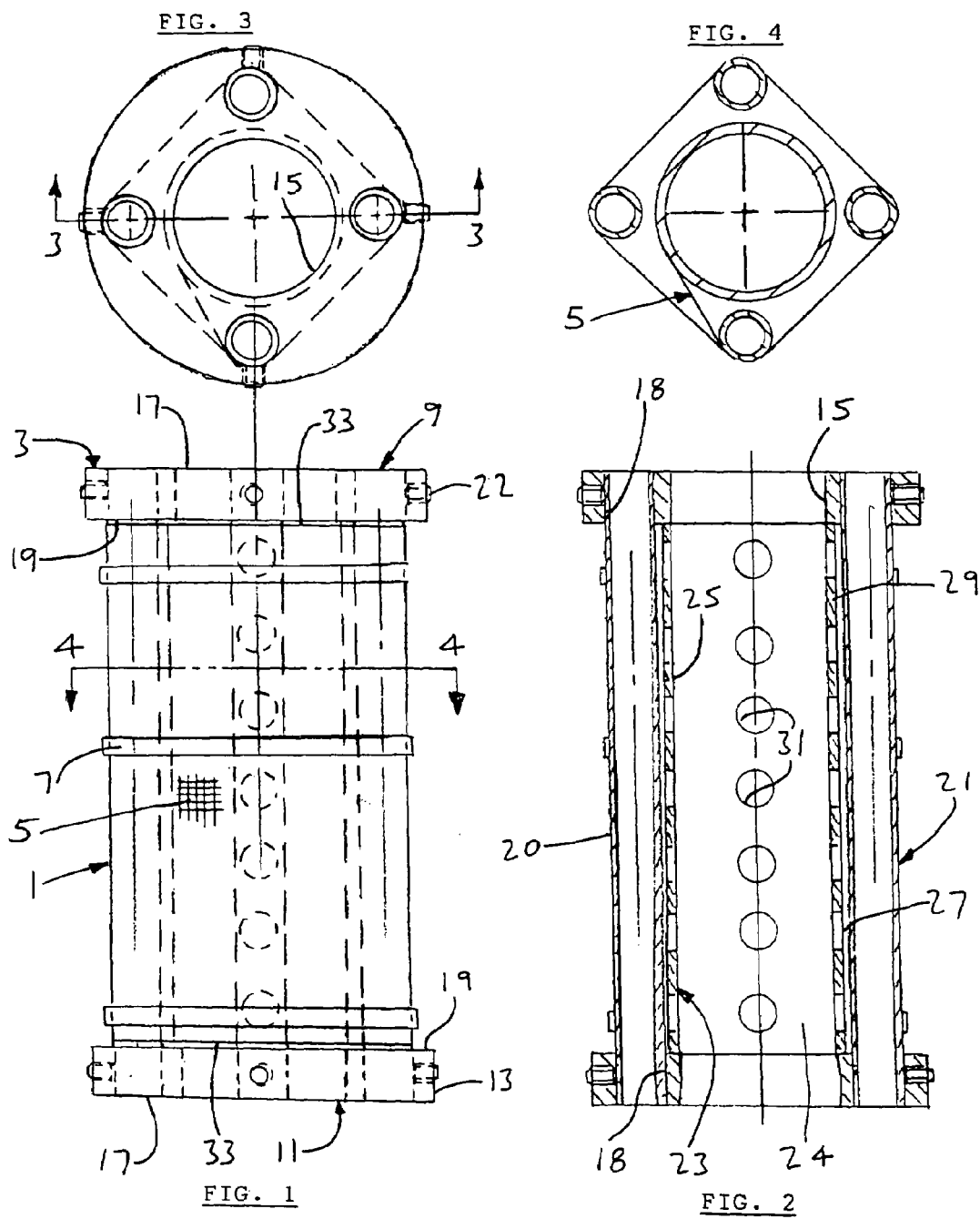

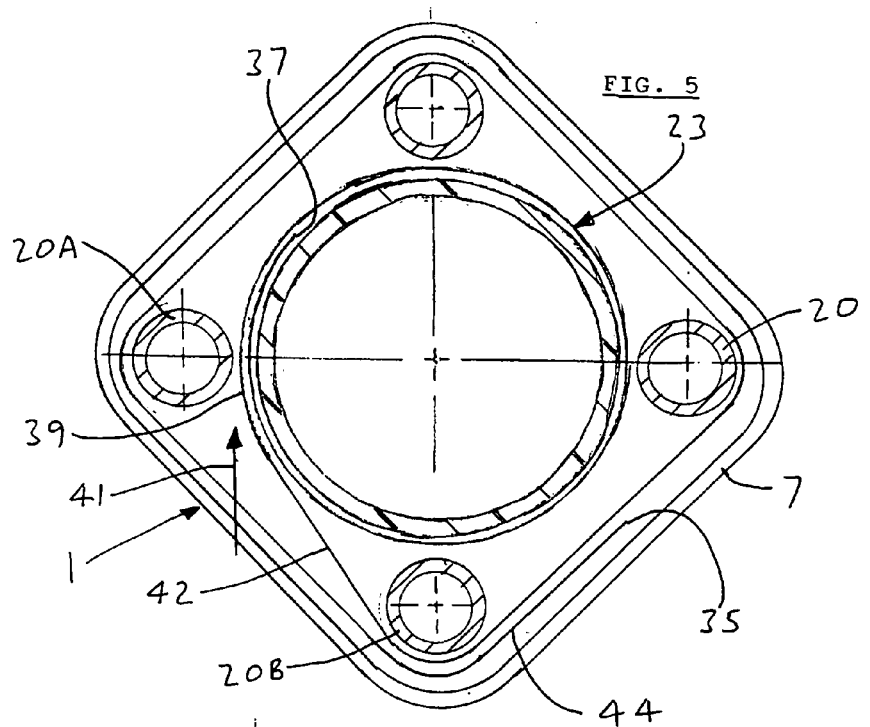
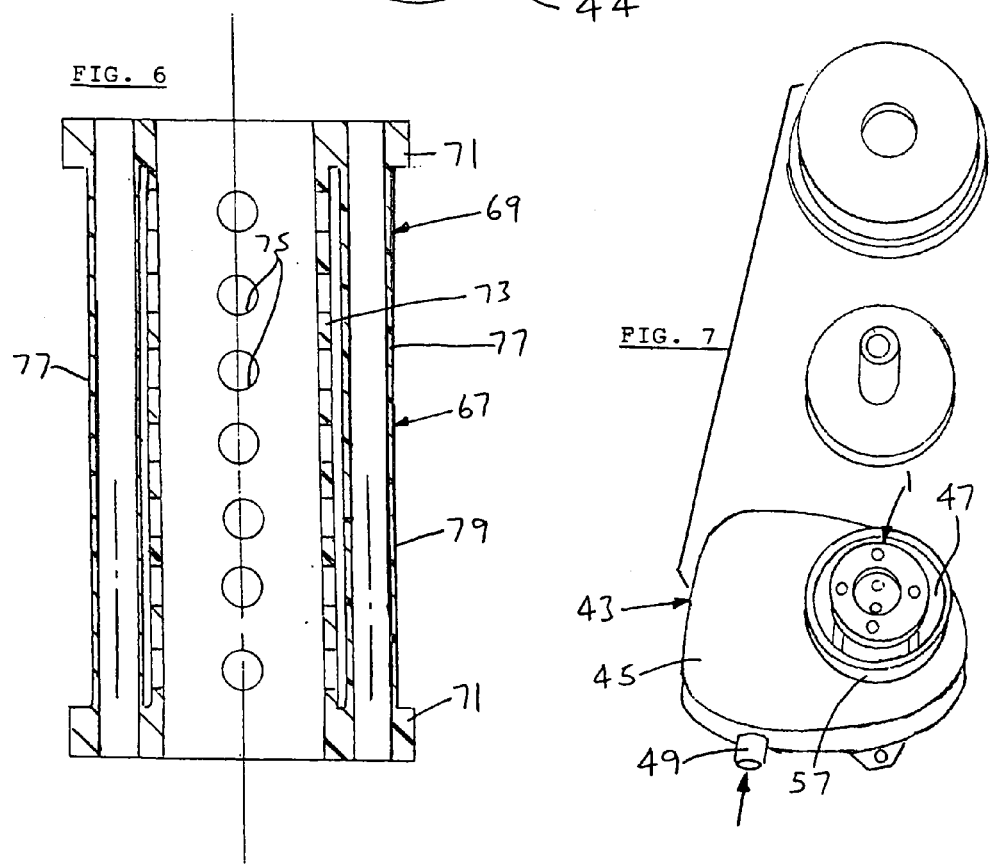

POOL PUMP FILTER

BACKGROUND OF THE INVENTION

1. Field of the Invention

The present invention relates to fluid filters, and more particularly to liquid filters having cleanable screens.

2. Description of the Related Art

Many different kinds of fluid filters have been developed over the years. They are available in a wide variety of sizes and shapes. The filtering media are also widely variable to suit the particular fluid to be filtered.

A particularly important type of filter is used with swimming pools. The filters are necessary to keep the water clean from such contaminants as grass, leaves, plastic, and paper.

In recent years, relatively small portable swimming pools have become increasing popular. Such pools are sometimes referred to as soft side pools, and they are marketed under trademarks such as Sand And Sun and Easy Set. Soft side pools are larger than traditional children's wading pools, but they are smaller than full size above-ground or in-ground pools. In some cases, soft side pools are quite large; one commercially available model is 18 feet long and four feet wide. Some soft side pools are inflatable using air pressure. Other models use the pool water to stabilize the pool in place.

The soft side pool invariably includes a pump system that continuously circulates water in the pool. Water is drawn out of the pool and then looped back into the pool through the pump system.

Like the larger above-ground and in-ground pools, soft side pools must be kept clean in order to assure maximum enjoyment by their users. Consequently, it is a common practice to include a water filter in the pump system. The filter traps solid debris from the water and permits only filtered water to circulate back to the pool. Eventually the filter becomes clogged.

In the past, the filters of soft side pool pump systems were disposable. That is, when the filters became clogged, they were discarded and replaced with a new filter. Depending on the amount of pool usage, a filter lasted between approximately one and two weeks. Consequently, it was a costly matter to keep the pools clean. Further, the discarded filters eventually ended up in landfills, which was undesirable from an environmental standpoint.

Thus, a need exists for improvements in filters for soft side pools.

SUMMARY OF THE INVENTION

In accordance with the present invention, a filter is provided that is considerably less and expensive and more environmentally satisfactory than prior filters. This is accomplished by apparatus that includes a cleanable flexible screen.

In addition to the screen, the filter of the invention is comprised of a cartridge that holds the screen. The cartridge is designed with a center tube, opposed end plates, and multiple posts. At least one end plate has a central opening. The end plates are secured to opposite ends of the posts so as to form a cage. The center tube is captured in the cage. Preferably, the center tube is free to move inside the cage. The center tube has a rather thin wall through which are several holes.

The screen of the invention may be of any suitable material and mesh. For example, the screen may be made of fiberglass and have openings approximately 0.06 inches square. The screen has a width between two longitudinal edges that is substantially equal to the distance between the cartridge end plates. The length of the screen between two ends is sufficient to enable the screen to wrap at least one time around the center tube and at least one time around the posts. A longer length screen is also within the scope of the present invention.

To assemble the filter, the screen is placed between the cartridge end plates with the screen longitudinal edges adjacent associated end plates. One end of the screen is laid against the center tube with the screen running end outside the posts. The center tube is rotated inside the cage at least one complete turn such that the center tube has at least one full inner wrap of the screen around it. Then the screen running end is wrapped at least one full outer wrap around the posts. There is a connecting section of the screen between the inner and outer wraps. If desired, there may be more than one wrap of screen around either or both the center tube and the posts. When the wraps are completed, the screen second end is a free end outside of the outer wrap. The screen is held in place on the cartridge by one or more ties, clamps, or bands that surround and hold the screen outer wrap against the posts.

In use, the filter is interchangeable with prior filters in a liquid pump housing. For example, the pump housing may have a chamber with a closed end and an open end, and a sealing ring that seals against the chamber open end. An inlet to the pump housing directs liquid to the chamber, from which the liquid flows through the wraps of screen and through the holes in the center tube into the center tube. The result is that the filter acts as a two stage filter, with the first stage being the screen outer wrap around the cartridge posts and the second stage being the screen inner wrap around the center tube. From the interior of the center tube, the liquid flows out an end plate and the sealing ring.

When the filter is dirty, the pump sealing ring is removed, and the filter is pulled from the pump chamber. The ties or bands are removed, and the screen is unwound from the cartridge. The screen is washed with plain water as needed, and then it is replaced on the cartridge. In that manner, clear liquid is discharged from the pump housing without having to replace either the filter or any of its components. The filter is cleanable as often as necessary without additional cost, detriment to the environment, or chemicals.

In a modified embodiment, the cartridge end plates, center tube, and posts are integral with each other. The screen is wrapped around the center tube without rotating the center tube independently of the end plates and posts. In all other respects, the modified filter is substantially identical to the filter with the loose center tube.

The method and apparatus of the invention, using a flexible cleanable screen, thus, filters liquids in an economical way. The necessity of discarding an entire dirty filter is eliminated, thus enhancing the environmental aspects of the invention.

Other advantages, benefits, and features of the invention will become apparent to those skilled in the art upon reading the detailed description of the invention and studying the drawings.

BRIEF DESCRIPTION OF THE DRAWINGS

FIG. 1 is a front view of the pool pump filter of the invention.

FIG. 2 is a top view of FIG. 1.

FIG. 3 is a cross-sectional view taken along line 3—3 of FIG. 2.

FIG. 4 is a cross-sectional view taken along line 4—4 of FIG. 1.

FIG. 5 is a view similar to FIG. 4, but on an enlarged scale.

FIG. 6 is a view generally similar to FIG. 3, but showing a modified embodiment of the invention.

FIG. 7 is an exploded perspective view of the pool pump filter of the invention in combination with a pump.

DETAILED DESCRIPTION OF THE INVENTION

Figure 8:
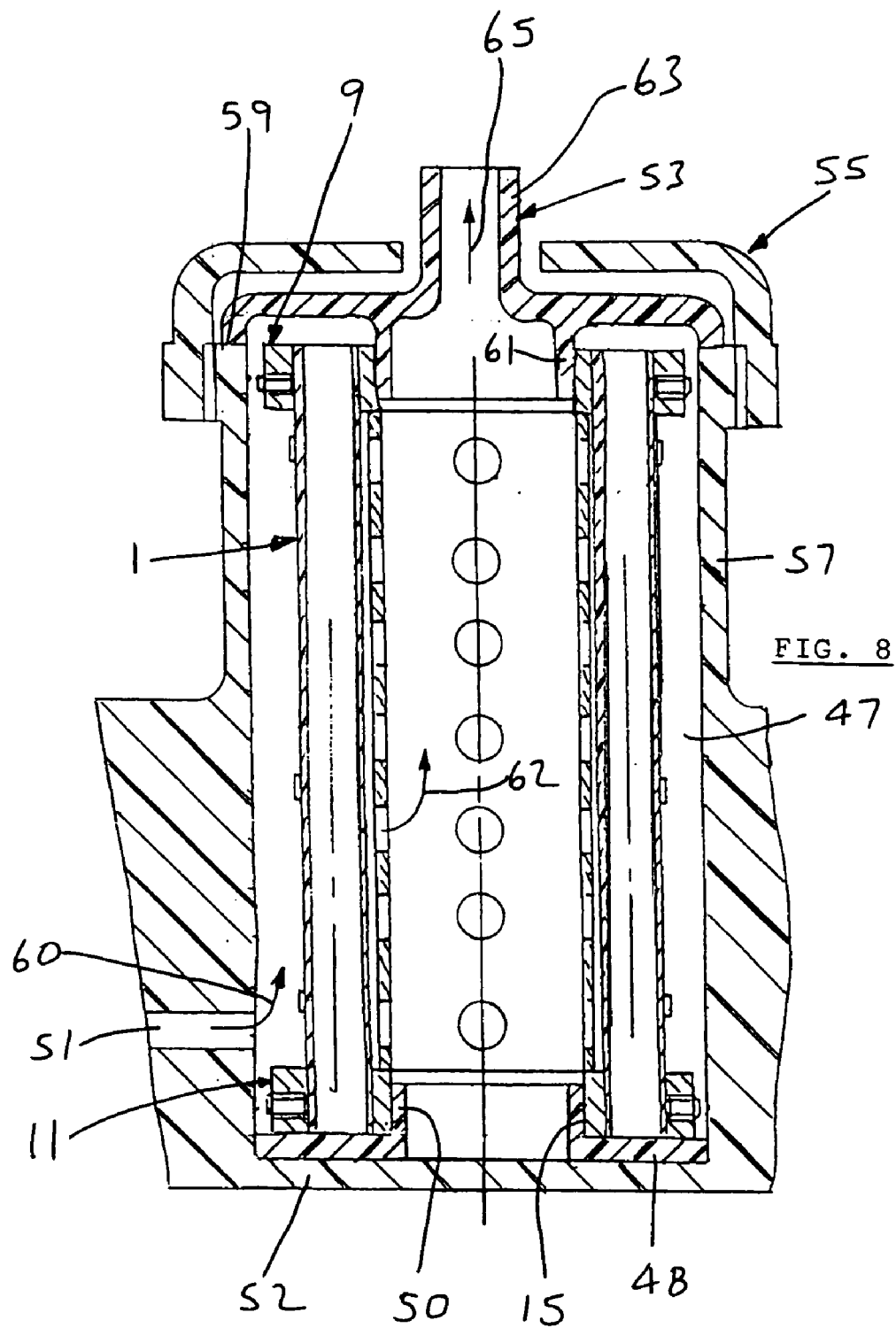
FIG. 8 is a cross-sectional view showing the pool pump filter of the invention assembled in a pool pump.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

Looking at FIGS. 1–4, an inexpensive pool pump filter 1 is illustrated that includes the present invention. The pool pump filter 1 is particularly useful for cleaning the water in soft side portable swimming pools. However, it will understood that the invention is not limited to recreational applications.

The pool pump filter 1 is comprised of a cartridge 3 and a screen 5. The screen 5 is removeably wrapable around the cartridge 3 and is held in place with one or more flexible bands 7.

The cartridge 3 includes a pair of generally identical end plates 9 and 11. The end plates 9 and 11 are illustrated as being rectangular in shape, but circular or other shapes are also acceptable. Each end plate has a outer periphery 13, a central opening 15, and opposed end surfaces 17 and 19. Extending between and secured to the end plates are a number of posts 20. In the illustrated construction, there are four posts 20, but more or fewer may be used, if desired. The ends of each post are received in associated holes 18 in the end plates and secured in place by any suitable means, such as an adhesive or clamps. In the particular construction illustrated, the posts are secured to the end plates by set screws 22. The end plates and posts together form a cage 21.

Captured in the cage 21 is a center tube 23. Preferably, the center tube 23 has a length that is slightly less than the distance between the end surfaces 19 of the end plates 9 and 11. The center tube has an interior 24 bounded by an inner diameter 25 that is approximately the same size as the central openings 15 in the end plates. The center tube has an outer diameter 27 that loosely fits between the posts 20. Thus, the center tube is free to move within the cage both axially between the end plates and radially between the posts, although the axial movement is quite small compared with the radial movement. The center tube wall 29 between the inner and outer diameters 25 and 27, respectively, defines a number of rather large holes 31. Together, the cage and center tube constitute the cartridge 3.

The screen 5 may be made from any material that is impervious to water or other liquid with which pool pump filter 1 will be used. Aluminum and fiberglass are two representative suitable materials. Similarly, the screen openings may be sized to suit the particular application. For portable soft side pools, I have found that a fiberglass screen with openings approximately 0.06 inches square works very well, although smaller openings are also acceptable.

The screen 5 is fabricated with opposed longitudinal edges 33 that are spaced apart slightly less that the distance between the end plate surfaces 19. The screen also has two ends 35 and 37, FIG. 5.

To assemble the screen 5 to the cartridge 3, the screen end 37 is fed in the direction of arrow 41 from outside the cartridge between two posts, such as posts 20A and 20B in FIG. 5, and is laid against the center tube 23. That action pulls the screen running end between the posts 20A and 20B in the direction of arrow 41. For clarity, the screen end 37 is shown spaced from the center tube in FIG. 5. The screen is wrapped around the center tube at least one full turn to make an inner wrap as shown at reference numeral 39. More than one turn may be used to make the inner wrap 39, if desired. Wrapping the screen around the center tube is easily accomplished by rotating the center tube while holding the cage 21 stationary. That action further pulls the screen running end between the posts 20A and 20B in the direction of arrow 41. After the screen has been wrapped around the center tube, the screen running end is wrapped around all the posts 20. At least one full turn is required around the posts to make an outer wrap as shown at reference numeral 44. There is a connecting section 42 of the screen running end between the inner and outer wraps 39 and 44, respectively. The second screen end 35 constitutes a free end and is alongside an underlayer of the outer wrap. Finally, one or more ties or bands 7 are placed over the screen to surround the screen outer wrap and hold it against the posts to complete the pool pump filter 1. Common commercially available elastic bands are satisfactory for the bands. For clarity, the band and screen are shown spaced from each other and from the posts in FIG. 5.

In FIGS. 7 and 8, the pool pump filter 1 is shown in use with a pump 43. The particular pump 43 is used to circulate water in a portable soft side pool. The pump has a housing 45 with an annular wall 57 that defines part of a chamber 47. As illustrated, the chamber 47 has a closed bottom end 52 and an open top end 59. The pump may include a locator piece 48 at the closed end 52. The locator piece has a pilot 50. The locator piece pilot 50 fits inside the opening 15 of the filter end plate 11. At the top of the chamber is a sealing ring 53. The sealing ring 53 is retained in place by a cap 55 that threads onto the pump housing wall 57. The sealing ring seals against the end surface 59 of the pump housing wall 57. The sealing ring is fabricated with a pilot 61 that fits inside the opening of the filter end plate 9.

Water from the pool flows through a tube, not shown, into an inlet 49 of the pump 43. From the inlet 49, the water flows through a motor driven pump, not illustrated in the drawings, and through a passage 51 to the chamber 47, arrow 60. The water flows through the screen outer wrap 44, through the screen inner wrap 39, and through the center tube holes 31 to the center tube interior 24, arrow 62. It is thus seen that the pool pump filter 1 is a two stage filter, one stage being the screen outer wrap and the other stage being the inner wrap 39. From the center tube interior, the water flows out an outlet 63 of the sealing ring 53, arrow 65. A tubing, not shown, connects the sealing ring outlet 63 to the pool.

When the pool pump filter 1 is dirty, it is cleaned in a very simple and speedy manner. The cap 55 is unthreaded from the pump housing 45, and the sealing ring 53 is removed. The filter is taken out of the pump chamber 47, and the bands 7 are removed. The screen 5 is unwrapped from the cartridge posts 20 and center tube 23. The screen is then cleaned in any suitable way, such as by spraying it with a garden hose. When the screen is clean, it is re-wrapped in the cartridge 3 as previously described. In that way, the filter of the invention is reusable, which greatly reduces the cost of maintaining the pool as well as saves on space in landfills.

Further in accordance with the invention, the cartridge for the pool pump filter may be made as a single piece. Turning to FIG. 6, a pool pump filter 67 is illustrated having a cartridge 69 that is molded as single piece from a suitable plastic material. The cartridge 69 has a pair of end plates 71 that are integral with and are spaced apart by a center tube 73. The center tube 73 has a rather thin wall that defines a number of holes 75. Also integral with the end plates 71 are at least two and preferably more posts 77. A screen substantially similar to the screen 5 of the pool pump filter 1 described above is used with the filter 67. Further, the screen is wrapped with inner and outer wraps in a manner identical to the wraps 39 and 44, respectively, of the filter 1. The result is the pool pump filter 67 that functions identically to the filter 1.

In summary, the results and advantages of portable soft side pools can now be more fully realized. The pool pump filter of the invention provides reusable cleaning advantages as well as environmental advantages. This desireable result comes from using the combined functions of the flexible screen 5. The screen is wrapped in inner and outer wraps 39, and 44, respectively, around the cartridge center tube and posts. As a result, the filter acts as a two stage filter. The rotatable nature of the center tube 23 in the cage 21 of the filter 1 makes the screen particularly easy to install and remove. For both cartridge designs 3 and 69, a dirty screen is easily removed, washed, and replaced on the cartridge. The filter of the invention is entirely interchangeable with prior filters used in soft side pools. The versatility of the invention is further demonstrated by the fact that the center tube may be separate from or integral with the end plates.

It will also be recognized that in addition to the superior performance of the pool pump filter of the invention, its construction is such as to cost less than traditional filters. Also, its reusable nature eliminates the need for landfill space as is necessary for prior throw-away filters.

Thus, it is apparent that there has been provided, in accordance with the invention, a pool pump filter that fully satisfies the objects, aims, and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A filter comprising:
   a. a cartridge comprising:
      i. first and second end plates at a predetermined distance apart, at least the first end plate having a central opening therethrough;
      ii. a center tube between the first and second end plates including a wall that defines at least one hole through; and
      iii. a plurality of posts extending between and secured to the end plates;
   b. a flexible screen having at least one first wrap around the center tube and at least one second wrap around the posts; and
   c. means for removeably holding the at least one screen second wrap against the posts.

2. The filter of claim 1 wherein:
   a. The end plates and posts form a cage; and
   b. the center tube is captured and is free to move inside the cage.

3. The filter of claim 1 wherein the end plates, center tube, and posts are integral with each other.

4. The filter of claim 1 wherein the means for removeably holding the at least one screen second wrap comprises at least one elastic band surrounding the screen second wrap and holding the at least one screen second wrap against the posts.

5. The filter of claim 1 wherein the screen has a first end that is laid against the center tube, and a second end that is a free end on the outside of the at least one screen second wrap.

6. The filter of claim 1 wherein the screen has opposed longitudinal edges that are spaced apart slightly less than the predetermined distance.

7. The filter of claim 1 wherein the screen has a mesh with approximately 0.06 inch openings.

8. Apparatus for filtering a fluid comprising:
   a. a cage comprising:
      i. a pair of end plates spaced a predetermined distance apart, at least one end plate having a central opening therethrough; and
      ii. at least three posts extending between and secured to the end plates;
   b. a center tube captured in the cage and having a wall that defines at least one hole therethrough;
   c. a screen having a first end laid against the center tube and a second end, the screen being wrapped with at least one first wrap around the center tube and with at least one second wrap around the posts, the screen second end being alongside the at least one second wrap; and
   d. means for holding the screen at least one second wrap against the posts.

9. The apparatus of claim 8 wherein the end plates, posts, and center tube are integral with each other.

10. The apparatus of claim 8 wherein the center tube is free to rotate inside the cage.

11. The apparatus of claim 8 wherein the screen is comprised of a fiberglass mesh having openings of approximately 0.06 inches.

12. The apparatus of claim 8 wherein the screen has opposed longitudinal edges that are spaced apart slightly less than the predetermined distance.

13. The apparatus of claim 8 wherein the means for holding the screen comprises at least one elastic band surrounding the at least one second wrap.

14. The apparatus of claim 8 wherein the screen comprises a connecting section between the at least one first wrap and the at least one second wrap.

15. In combination with a pump having a chamber with an open end and a fluid inlet passage to the chamber; a sealing ring removeably sealed to the chamber open end and having an outlet passage; and means for pumping fluid through the inlet passage to the chamber and out the sealing ring outlet passage,
   a two-sage filter insertable into and removable from the pump chamber comprising:
   a. a cartridge comprising a center tube having a foraminous wall, and a plurality of posts each secured to two spaced apart end plates having respective central openings and cooperating with the posts to capture the center tube between the end plates and posts;
   b. a screen having at least one first wrap around the center tube and at least one second wrap around the posts; and
   c. means for holding the at least one second wrap around the posts, so that a fluid pumped through the inlet passage to the chamber flows through the filter at least one second wrap, through the at least one first wrap, and through the center tube wall to the sealing ring outlet passage.

16. The combination of claim 15 wherein:
   a. the pump further has a locating piece in the chamber; and
   b. the locator piece has a pilot that fits in the central opening of one of the filter cartridge end plates.

17. The combination of claim 15 wherein the sealing ring has a pilot that fits within the central opening of one of the cartridge end plates.

18. The combination of claim 15 wherein the center tube is free to move inside the posts and end plates.

19. The combination of claim 15 wherein cartridge end plates, center tube, and posts are integral with each other.

20. The combination of claim 15 wherein the screen comprises a connecting section between the at least one first and second wraps.

21. The combination of claim 15 wherein:
  a. the cartridge end plates are at a predetermined distance apart; and
  b. the screen has opposed longitudinal edges that are spaced apart a distance slightly less than the predetermined distance.

22. The combination of claim 15 wherein the end plates are rectangular in shape, and wherein there are four posts secured to the end plates.

23. The combination of claim 15 wherein the means for holding the screen comprises multiple elastic bands surrounding and pressing the at least one second wrap against the posts.

24. A method of assembling a filter comprising the steps of:
  a. providing first and second end plates at a predetermined distance apart;
  b. providing multiple posts, said multiple posts extending between and secured to said plates;
  c. capturing a foraminous center tube between the end plates and the posts;
  d. wrapping the screen with at least one inner wrap around the center tube;
  e. wrapping the screen with at least one outer wrap around the posts; and
  f. holding the at least one outer wrap against the posts.

25. The method of claim 24 wherein the step of providing a pair of end plates comprises the step of providing at least one end plate with a central opening therethrough.

26. The method of claim 24 wherein the steps of securing the end plates to each other and capturing a foraminous center tube comprises the steps of making the end plates, center tube, and posts integral with each other.

27. The method of claim 24 wherein the step of capturing a center tube comprises the step of capturing the center tube to freely move relative to the posts and end plates.

28. The method of claim 27 wherein the step of wrapping the screen with at least one inner wrap comprises the steps of:
  a. laying a first end of the screen against the center tube; and
  b. rotating the tube relative to the posts and end plates at least one turn and thereby wrapping the screen with at least one wrap on the center tube.

29. The method of claim 24 wherein the step of wrapping the screen with at least one inner wrap comprises the steps of:
  a. feeding a first end of the screen between two posts toward the center tube and thereby pulling a screen running end between the two posts;
  b. laying the screen first end against the center tube; and
  c. wrapping the screen with at least one full inner wrap around the center tube and thereby further pulling the screen running end between the posts.

30. The method of claim 29 wherein the step of wrapping the screen with at least one inner wrap comprises the step of rotating the center tube relative to the posts.

31. The method of claim 29 wherein the step of wrapping the screen with at least one outer wrap comprises the step of:
  a. wrapping the screen running end around the posts with at least one full wrap; and
  b. providing a connecting section on the screen between the at least one inner and outer wraps.

32. The method of claim 24 wherein the step of holding the at least one outer wrap comprises the step of surrounding and pressing the at least one outer wrap against the posts.

33. A method of filtering a liquid comprising the steps of:
  a. providing a chamber having a inlet passage and an open end;
  b. sealing the chamber open end with a sealing ring having an outlet;
  c. providing a two-stage filter comprising the steps of;
    i. capturing a center tube having a foraminous wall between two end plates each secured to opposed ends of multiple posts;
    ii. wrapping a flexible screen with at least one inner wrap around the center tube;
    iii. wrapping the flexible screen with at least one outer wrap around the posts; and
    iv. surrounding and holding the at least one outer wrap against the posts;
  d. inserting the filter into the chamber; and
  e. flowing liquid through the inlet passage to the chamber, through the filter, and out the sealing ring outlet.

34. The method of claim 33 wherein the step of capturing a center tube comprises the step of enabling the center tube to move freely between the end plates and the posts.

35. The method of claim 33 wherein the step of capturing a center tube comprises the step of forming the end plates, posts, and center tube integral with each other.

36. The method of claim 33 wherein the step of wrapping a flexible screen with at least one inner wrap comprises the steps of:
  a. laying a first end of the screen against the center tube; and
  b. rotating the center tube relative to the end plates and posts with at least one full turn and thereby wrapping the screen around the center tube with at least one full inner wrap.

37. The method of claim 36 wherein the step of wrapping the flexible screen with at least one outer wrap comprises the steps of:
  a. pulling a screen running end between two posts in response to turning the center tube; and
  b. wrapping the screen running end around the posts with at least one full outer wrap.

38. The method of claim 37 comprising the further step of providing a connecting section in the flexible screen between the at least one inner and outer wraps.

39. The method of claim 33 comprising the further steps of:
  a. removing the filter from the chamber;
  b. unwrapping the at least one outer and inner wraps of the screen from the posts and center tube, respectively;
  c. cleaning the screen;
  d. rewrapping the at least one inner and outer wraps around the center tube and posts, respectively;
  e. surrounding and holding the at least one outer wrap against the posts; arid
  f. inserting the filter back into the chamber.

40. The method of claim 33 wherein the step of flowing liquid through the filter comprises the step of flowing water through the filter at least one outer wrap in a first stage, through the filter at least one inner wrap in a second stage, and through the center tube wall to a center tube interior to the sealing ring outlet.

* * * * *

UNITED STATES PATENT AND TRADEMARK OFFICE
CERTIFICATE OF CORRECTION

PATENT NO. : 7,115,204 B1
APPLICATION NO. : 10/713698
DATED : October 3, 2006
INVENTOR(S) : Ernest D. Frasier It is certified that error appears in the above-identified patent and that said Letters Patent is hereby corrected as shown below:

Column 6, line 42, delete "two-sage" and substitute -- two-stage --

Column 8, line 5, after "having" delete "a" and substitute -- an --

Column 8, line 9, after "of" delete ";" (semi-colon) and substitute -- : -- (colon)

Column 8, line 56, delete "arid" and substitute -- and --.

Signed and Sealed this

Ninth Day of January, 2007

JON W. DUDAS
*Director of the United States Patent and Trademark Office*